United States Patent
Tokarev Sela et al.

(10) Patent No.: US 11,698,918 B2
(45) Date of Patent: Jul. 11, 2023

(54) SYSTEM AND METHOD FOR CONTENT-BASED DATA VISUALIZATION USING A UNIVERSAL KNOWLEDGE GRAPH

(71) Applicant: Sisense Ltd., Ramat Gan (IL)

(72) Inventors: Inna Tokarev Sela, Tel Aviv (IL); Yael Lev, Tel Aviv (IL); Guy Boyangu, Tel Aviv (IL); Yuval Shkolar, Tel Aviv (IL); Amnon Lotenberg, Tel Aviv (IL)

(73) Assignee: SISENSE LTD., Ramat Gan (IL)

( * ) Notice: Subject to any disclaimer, the term of this patent is extended or adjusted under 35 U.S.C. 154(b) by 0 days.

(21) Appl. No.: 17/083,697

(22) Filed: Oct. 29, 2020

(65) Prior Publication Data
US 2021/0042589 A1 Feb. 11, 2021

Related U.S. Application Data

(63) Continuation-in-part of application No. 16/876,943, filed on May 18, 2020.

(60) Provisional application No. 63/076,713, filed on Sep. 10, 2020, provisional application No. 62/850,760, filed on May 21, 2019.

(51) Int. Cl.
*G06F 16/28* (2019.01)
*G06F 3/04842* (2022.01)
*G06N 5/02* (2023.01)
*G06F 18/20* (2023.01)
*G06F 18/22* (2023.01)

(52) U.S. Cl.
CPC ........ *G06F 16/285* (2019.01); *G06F 3/04842* (2013.01); *G06F 18/22* (2023.01); *G06F 18/29* (2023.01); *G06N 5/02* (2013.01)

(58) Field of Classification Search
CPC .......... G06N 5/02; G06N 5/022; G06N 5/025; G06F 3/0482; G06F 40/30; G06F 16/38; G06F 16/383; G06F 16/24; G06F 16/242; G06F 16/2423; G06F 16/2428; G06F 16/243; G06F 16/245; G06F 16/2455; G06F 16/2465; G06F 16/248; G06F 16/26
See application file for complete search history.

(56) References Cited

U.S. PATENT DOCUMENTS

| | | |
|---|---|---|
| 6,519,592 B1 | 2/2003 | Getchius et al. |
| 9,558,265 B1 | 1/2017 | Tacchi et al. |
| 10,216,860 B2 | 2/2019 | Miranker et al. |

(Continued)

*Primary Examiner* — Robert W Beausoliel, Jr.
*Assistant Examiner* — Cheryl M Shechtman
(74) *Attorney, Agent, or Firm* — M&B IP Analysts, LLC (57) ABSTRACT

A system and method for generating data visualizations. The method includes generating an enriched data layer based on a plurality of knowledge graphs, the plurality of knowledge graphs including a plurality of first nodes, the enriched data layer including a plurality of second nodes, wherein each of the plurality of second nodes is connected via an edge to at least one of the plurality of first nodes; and generating a data visualization based on the enriched data layer and a request for data, wherein the request for data indicates a type of data corresponding to at least one of the plurality of second nodes, wherein the data visualization is generated using data represented by at least one of the plurality of first nodes connected to the at least one of the plurality of second nodes.

20 Claims, 6 Drawing Sheets

(56) References Cited

U.S. PATENT DOCUMENTS

| | | | |
|---|---|---|---|
| 10,452,458 B2 | 10/2019 | Seto | |
| 10,997,244 B2* | 5/2021 | Russell | G06F 21/56 |
| 2003/0033288 A1 | 2/2003 | Shanahan et al. | |
| 2010/0281029 A1 | 11/2010 | Parikh et al. | |
| 2014/0280307 A1 | 9/2014 | Gupta et al. | |
| 2014/0330804 A1 | 11/2014 | Bao et al. | |
| 2014/0344265 A1 | 11/2014 | Boucher et al. | |
| 2015/0169758 A1* | 6/2015 | Assom | G06F 16/36 |
| | | | 707/603 |
| 2015/0370787 A1 | 12/2015 | Akbacak et al. | |
| 2016/0239758 A1 | 8/2016 | Jeong et al. | |
| 2016/0267166 A1* | 9/2016 | Kohlmeier | G06F 16/9024 |
| 2016/0373456 A1 | 12/2016 | Vermeulen et al. | |
| 2017/0068903 A1* | 3/2017 | Hakkani-Tur | G06N 20/00 |
| 2017/0076206 A1 | 3/2017 | Lastras-Montano et al. | |
| 2017/0329844 A1 | 11/2017 | Tacchi et al. | |
| 2017/0330094 A1 | 11/2017 | Lindsley | |
| 2017/0344711 A1 | 11/2017 | Liu et al. | |
| 2018/0129959 A1 | 5/2018 | Gustafson et al. | |
| 2018/0137424 A1 | 5/2018 | Royval et al. | |
| 2018/0150750 A1 | 5/2018 | Verdejo et al. | |
| 2018/0218066 A1 | 8/2018 | Krishnan et al. | |
| 2018/0357238 A1 | 12/2018 | Cowan et al. | |
| 2019/0057310 A1* | 2/2019 | Olmstead | G06K 9/6215 |
| 2019/0087755 A1 | 3/2019 | Hull et al. | |
| 2019/0095530 A1 | 3/2019 | Booker et al. | |
| 2019/0146970 A1 | 5/2019 | Chamieh et al. | |
| 2019/0294732 A1 | 9/2019 | Srinivasan et al. | |
| 2020/0097560 A1 | 3/2020 | Kulkarni | |
| 2020/0117658 A1 | 4/2020 | Venkata et al. | |
| 2020/0250235 A1 | 8/2020 | Abhyankar et al. | |
| 2020/0301953 A1 | 9/2020 | Abhyankar et al. | |
| 2020/0372026 A1 | 11/2020 | Hyde et al. | |
| 2021/0064609 A1 | 3/2021 | Riscutia et al. | |
| 2021/0166141 A1* | 6/2021 | Taguchi | G06N 5/02 |
| 2022/0075948 A1* | 3/2022 | Yuan | G06F 16/9024 |

* cited by examiner

SYSTEM AND METHOD FOR CONTENT-BASED DATA VISUALIZATION USING A UNIVERSAL KNOWLEDGE GRAPH

CROSS-REFERENCE TO RELATED APPLICATIONS

This application claims the benefit of U.S. Provisional Application No. 63/076,713 filed on Sep. 10, 2020. This application is also a continuation-in-part of U.S. patent application Ser. No. 16/876,943 filed on May 18, 2020, now pending. The Ser. No. 16/876,943 application claims the benefit of U.S. Provisional Application No. 62/850,760 filed on May 21, 2019.

All of the applications referenced above are hereby incorporated by reference.

TECHNICAL FIELD

The present disclosure relates generally to semantic graphs, and more specifically to generating data visualization using semantic graphs.

BACKGROUND

Business Intelligence is a field of endeavor which, among other things, attempts to give raw data (e.g. collected measurements) meaning and context which a human user can use to gain insights. In order to create a visual representation of data, a data model may need to be generated. This data model may be created based on assumptions from a human being, who may or may not be a user of the system. Assumptions made by human beings are subject to human error and subjective biases, and can therefore result in inaccurate visual representations of data.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for method for generating data visualizations. The method comprises: generating an enriched data layer based on a plurality of knowledge graphs, the plurality of knowledge graphs including a plurality of first nodes, the enriched data layer including a plurality of second nodes, wherein each of the plurality of second nodes is connected via an edge to at least one of the plurality of first nodes; and generating a data visualization based on the enriched data layer and a request for data, wherein the request for data indicates a type of data corresponding to at least one of the plurality of second nodes, wherein the data visualization is generated using data represented by at least one of the plurality of first nodes connected to the at least one of the plurality of second nodes.

Certain embodiments disclosed herein also include a non-transitory computer readable medium having stored thereon causing a processing circuitry to execute a process, the process comprising: generating an enriched data layer based on a plurality of knowledge graphs, the plurality of knowledge graphs including a plurality of first nodes, the enriched data layer including a plurality of second nodes, wherein each of the plurality of second nodes is connected via an edge to at least one of the plurality of first nodes; and generating a data visualization based on the enriched data layer and a request for data, wherein the request for data indicates a type of data corresponding to at least one of the plurality of second nodes, wherein the data visualization is generated using data represented by at least one of the plurality of first nodes connected to the at least one of the plurality of second nodes.

Certain embodiments disclosed herein also include a system for generating data visualizations. The system comprises: a processing circuitry; and a memory, the memory containing instructions that, when executed by the processing circuitry, configure the system to: generate an enriched data layer based on a plurality of knowledge graphs, the plurality of knowledge graphs including a plurality of first nodes, the enriched data layer including a plurality of second nodes, wherein each of the plurality of second nodes is connected via an edge to at least one of the plurality of first nodes; and generate a data visualization based on the enriched data layer and a request for data, wherein the request for data indicates a type of data corresponding to at least one of the plurality of second nodes, wherein the data visualization is generated using data represented by at least one of the plurality of first nodes connected to the at least one of the plurality of second nodes.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for content-based data visualization using a universal knowledge graph. A universal knowledge graph is created based on multiple semantic knowledge graphs. Each graph includes nodes, and the universal knowledge graph includes the nodes from each of the semantic knowledge graphs. Each node may be connected to one or more other nodes in the same graph via one or more edges. Creating the universal knowledge graph includes identifying associations between semantic knowledge graphs and determining associated nodes between the associated semantic knowledge graphs.

The universal knowledge graph is utilized to generate a data visualization, which can be displayed to a user (e.g., via a graphical user interface). The data visualization may include one or more recommendations of connections between users indicated in one semantic knowledge graph and users indicated in another semantic knowledge graph.

In an embodiment, one or more of the semantic knowledge graphs are generated based on events recorded in an event log. Each event may be an access of data from a data source such as, but not limited to, executing a query, updating a report widget, and the like. Each event record is parsed to identify objects and relationships between the objects. The semantic graph is generated with nodes corresponding to the identified objects and edges corresponding to the identified relationships. Each edge may be further assigned a weight based on a number of appearances of the related objects together in the parsed records. A given pair of nodes may further have multiple edges between them.

The disclosed embodiments include techniques for using established knowledge graphs to generate dashboards for new users. A dashboard is a graphical user interface which includes one or more widgets, indicators, and the like. The widgets are individual interfaces which correspond to one or more queries executed on a data source. A widget may be a graphical representation such as a pie chart, graph, line chart, and the like. Initially, a dashboard may lack any widgets associated thereto.

In this regard, it is noted that one of the challenges in the field of business intelligence reports is that the abundance of data in data sources and the sheer size of data models creates a difficulty for users when searching for data. More specifically, it is impractical for users to manually determine where to begin searching in large databases in order to maximize their search effectiveness. The disclosed embodiments provide users with initial dashboards prepopulated with one or more widgets that reduce the amount of input needed from a user in order to begin searching.

It should be noted that various embodiments described herein are discussed with respect to dashboards including example visualizations of data, but that the disclosed embodiments are not limited to any particular visualization. A dashboard may include, but is not limited to, instructions for rendering one or more widgets (each based on one or more queries) and an order in which the widgets should be rendered. Further, content-based visualizations as described herein are not limited to dashboards and may be implemented in other solutions such as, but not limited to, digest push notifications, visualizations integrated in third party software applications, and the like.

Figure 1:
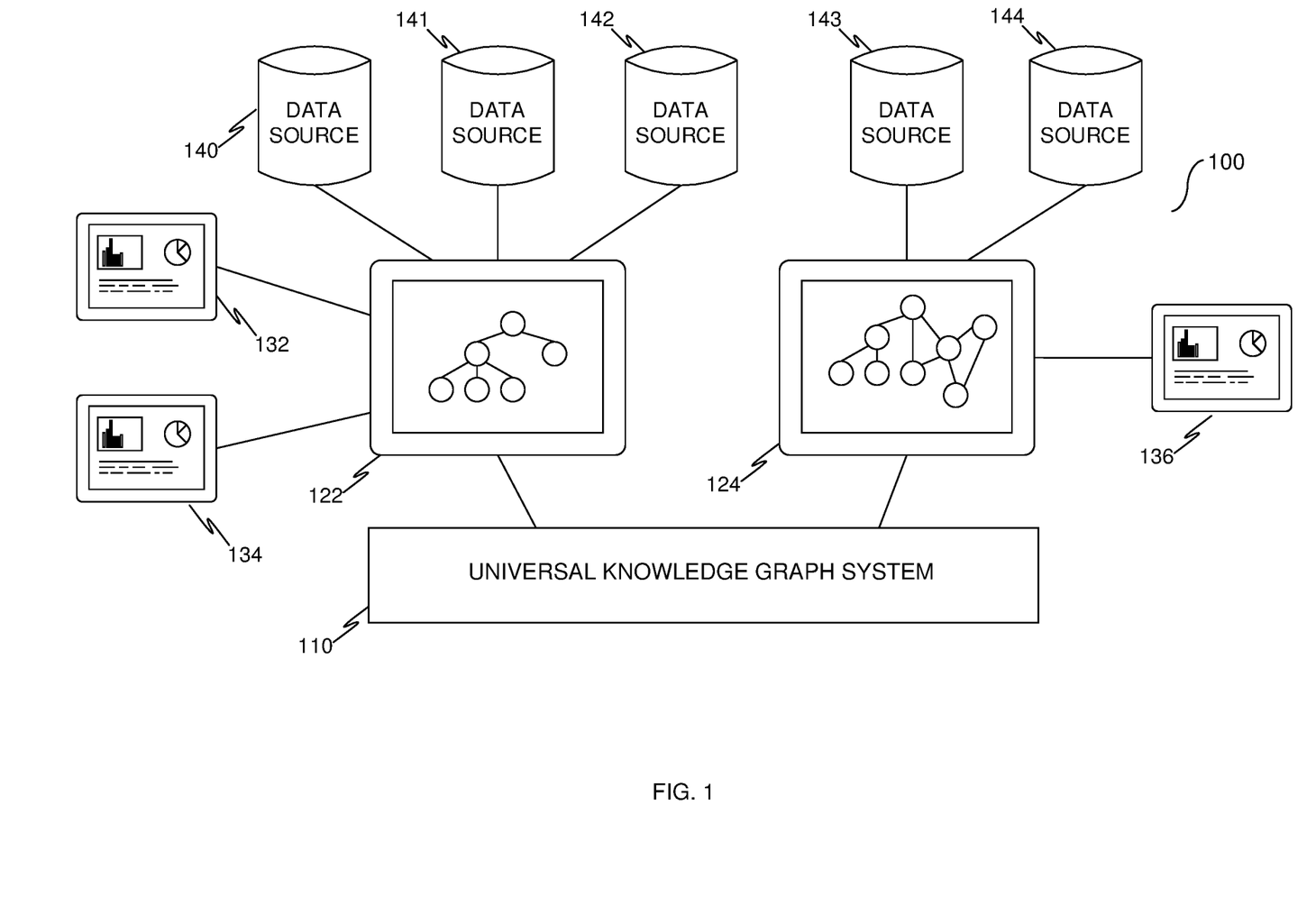
FIG. 1 is a relations diagram utilized to describe various disclosed embodiments.

FIG. 1 is a relations diagram 100 utilized to describe various disclosed embodiments. In the example communications diagram 100, a universal knowledge graph (UKG) system 110 communicates with one or more local knowledge graph systems. In the non-limiting example shown in FIG. 1, such local knowledge graph systems include knowledge graph systems 122 and 124. Each local knowledge graph system stores a knowledge graph created based on interactions of different groups of users with corresponding user devices, different data sources, and the like. In the example implementation shown in FIG. 1, the knowledge graph system 122 includes a knowledge graph which is generated based on interactions of user devices 132 and 134 with data sources 140, 141, and 142.

An interaction is a communication with a data source that causes data to be accessed, manipulated, or both. Non-limiting example interactions may include, but are not limited to, generating a query directed at one or more data sources, initiating a build of a data cube based on data in data sources, and the like. An interaction of a user device with a data source may be caused by a user requesting one or more actions with respect to the data source, for example via a user interface of an analytic application. As a non-limiting example, a user of the user device 132 may interact with the data source 140 by generating a query directed to a set of data stored in the data source 140.

Each of the knowledge graphs 132, 134, and 136 include nodes and may further include edges connecting the nodes. In an embodiment, the nodes represent objects related to events and the edges represent relationships between those objects. To this end, the knowledge graphs 132, 134, and 136 may be semantic knowledge graphs created based on query objects described in an event log and relationships among those query objects indicated in events of the event log. An example for creating a semantic knowledge graph is discussed in more detail below with respect to FIG. 6 and in the above-referenced U.S. patent application Ser. No. 16/876,943, assigned to the common assignee, the contents of which are incorporated in their entirety herein. The generation of a knowledge graph may be affected by the data sources available and the interaction of users with the data sources via user devices.

A universal knowledge graph system 110 generates a universal knowledge graph based on knowledge graphs received from one or more sources. In an embodiment, the universal graph may be generated based on multiple distinct sources such that a first source corresponds to a first customer account and a second source corresponds to a second, distinct, customer account. Each customer account may include one or more user accounts which share a common model, or which share a common model and common data source(s).

Each knowledge graph has a distinct structure. The structure of a knowledge graph may be affected by queries initiated by users or predetermined by the dashboard use, and by data and metadata at the data source. In an example implementation, the queries may be initiated via a natural language query (NLQ) interface, such as described in more detail in U.S. patent application Ser. No. 16/731,668, assigned to the common assignee, the contents of which are hereby incorporated by reference.

By creating universal knowledge graphs including and connecting nodes from multiple local knowledge graphs, the universal knowledge graph system 110 effectively connects the different local knowledge graphs. In an embodiment, a connection between knowledge graphs is achieved by merging a plurality of knowledge graphs into a single graph. In another embodiment, the connection is achieved by generating an enriched data layer which connects one or more nodes in a first knowledge graph to one or more nodes in a second knowledge graph.

The enriched data layer is a unified semantic representation of the queries which are used to generate the respective knowledge graphs of each customer account (i.e., the local knowledge graphs). In an embodiment, the nodes and edges of a first local graph and of a second local graph may be merged together, forming a universal graph. In another embodiment, the first local graph and the second local graph may each be associated with one or more enriched data layers such that the first local graph, the second local graph, and the one or more enriched data layers collectively form the universal knowledge graph.

Figure 2:
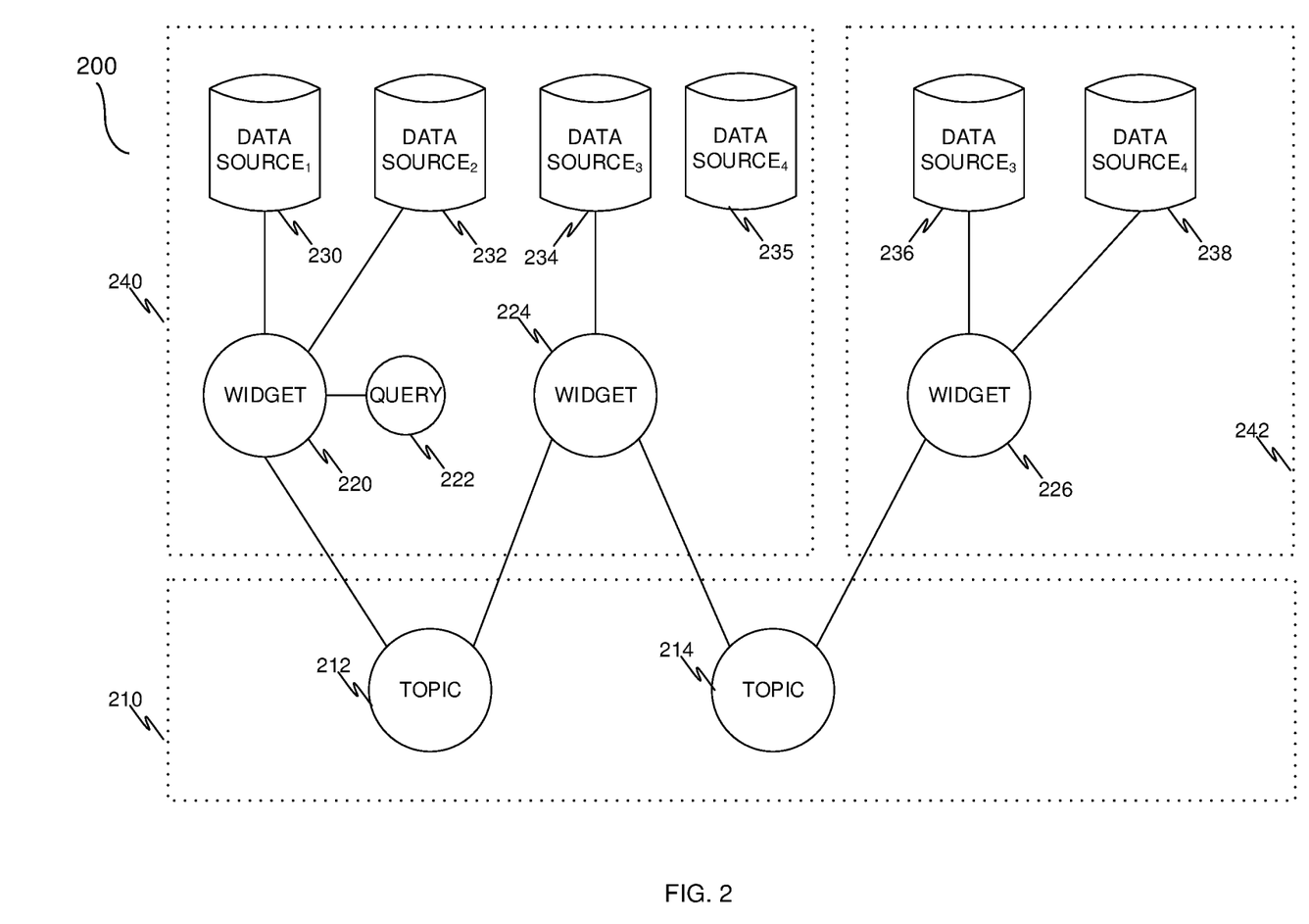
FIG. 2 is a schematic illustration of an enriched layer of a universal knowledge graph system applied to multiple local knowledge graph system utilized to describe various disclosed embodiments.

FIG. 2 is a schematic illustration 200 showing an enriched layer 210 of a universal knowledge graph applied to multiple local knowledge graph systems according to an embodiment.

An enriched data layer 210 includes a plurality of objects which are used to classify data. In the example shown in FIG. 2, a first object 212 and second object 214 are topic nodes. Each topic node is a node used to classify other nodes by topic. That is, a node connected to a topic node is considered to be related to a topic represented by the topic node. The topic nodes therefore provide a component of the enriched data layer which connect. A topic may be a word or combination of words, numbers, and the like. Example topics may include, but are not limited to, 'sales', 'human resources', 'marketing', and the like.

In an embodiment, the topic nodes may be the result of words embedded into a matrix of topic vectors. For example, a widget represented by a widget node 220 may be accessed to determine all words, strings, numbers, and the like, associated with the widget. In the example shown in FIG. 2, the widget node 220 is connected by an edge with a query node 222. The query node 222 represents a query which is executed on a data source 230 storing a first type of data and on a data source 232 storing a second type of data. The result of the query is presented on a dashboard via the widget node 220.

The query, metadata associated with the query node 222 representing the query, metadata associated with the widget 220, and metadata associated with the data source 230 and data source 232 are analyzed to determine a match between the query with one or more topics. A match may result in generating an edge between any of the aforementioned nodes and the relevant topic node. In an embodiment, the matching may be performed by word embedding. Such word embedding may include, but is not limited to, mathematical embedding from a first multiple-dimension per word space into a continuous vector space having a lower dimension than the first multiple dimension space. The result of the embedding may be used to determine a vector distance between a node and a topic node. An edge connecting a node to a topic node is generated if the distance vector between the node and the topic node is less than a predetermined threshold value. In the example shown in FIG. 2, widgets 220 and 224 are associated with a first dashboard and a first knowledge graph 240, and widget 226 is associated with a second dashboard and a second knowledge graph 242.

The enriched layer 210 includes a first topic node 212 and a second topic node 214. The widget 224 associated with the first dashboard and knowledge graph 240 and the widget 226 associated with the second dashboard and knowledge graph 242 are each connected via a respective edge to the topic node 214. In the example shown in FIG. 2, the universal knowledge graph 110 would determine that the widgets 224 and 226 are similar based on a determination that the data source 234 (which is connected to the widget 224) is of a certain type and the data source 236 (which is connected to the widget 226) is likewise of the same type.

In this regard, it is noted that data sources are not necessarily formatted in the same way such that queries to different data sources may appear to be different even though the actual content of the data being queried or the content being queried for is very similar. In particular, this may affect attempts to connect nodes representing queries to different data sources. The disclosed embodiments therefore utilize the types of data stored by the respective data sources in order to determine which nodes of a universal knowledge graph are to be connected to nodes of different local knowledge graphs.

Other attributes may be used to determine similarity. Such attributes may include, but are not limited to, queries that are associated with the widgets, various metadata (e.g., metadata of nodes of knowledge graphs) as mentioned above, tables stored on the data sources, and the like. Similarity can be based on data structure.

By providing a universal knowledge graph linking nodes representing queries related to different data sources, the disclosed embodiments allow for providing insights about how data may be used by other users. For example, a widget related to Human Resources (e.g., a widget configured to determine average overtime paid) may be monitored by multiple different organizations utilizing similar queries. When a new user of the BI system monitors widgets related to 'Human Resource' topics, a widget of 'average overtime paid' may be suggested to them, thereby increasing the value they receive from the system, as this provides an insight which they would not otherwise have gained.

One advantage of the proposed solution is the ability to generate a suggestion to a user of the first dashboard to connect a data source 235 of a fourth type to the widget 224, since this type of connection is present between data source 238 and widget 226. As noted above, this may provide additional benefit and allow a user to achieve insights which might not otherwise be readily available. A business intelligence system utilizing the disclosed embodiments is therefore clearly advantageous over business intelligence systems that generate queries or recommendations without identifying potential connections between nodes related to different data sources.

Figure 3:
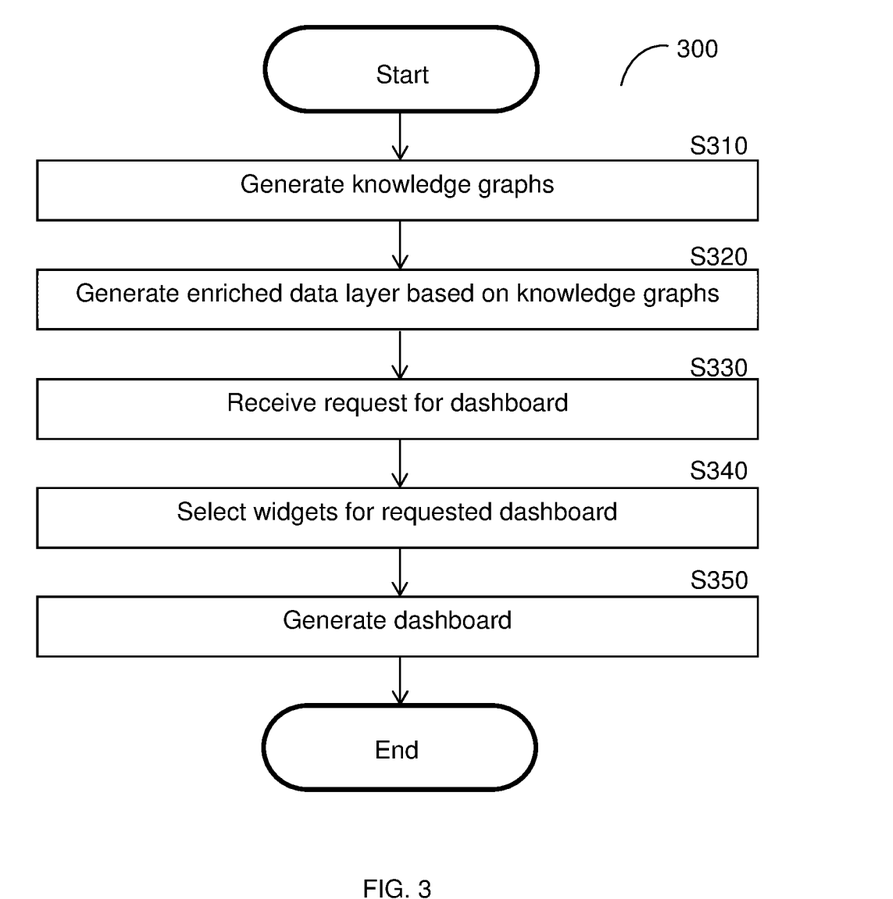
FIG. 3 is a flowchart illustrating a method for generating a graphical user interface including a dashboard populated using an enriched data layer according to an embodiment.

FIG. 3 is a flowchart 300 illustrating a method for generating graphical user interface including a populated dashboard according to an embodiment.

At S310, knowledge graphs are generated. Each knowledge graph includes a plurality of nodes which are linked to each other via edges. Each node may represent a user-related entity (e.g., a user, user data, user metadata, a portion thereof, etc.) or a query-related entity such as, but not limited to, a data source, table, column, query, sub-query (i.e., a portion of a query), and the like. Each edge is a connector linking nodes to each other. Each edge may represent a different type of connection. Edges may be updated, evicted, or both. In a further embodiment, edges may have respective weights indicating relative strengths of the connections (e.g., relative to other edges). Example semantic knowledge graphs which may be utilized in accordance with the disclosed embodiments are described below with respect to FIG. 6 and in the above-referenced U.S. patent application Ser. Nos. 16/876,943 and 16/731,668, each assigned to the common assignee, the contents of each are hereby incorporated by reference.

In an embodiment, a single knowledge graph may be generated rather than a plurality of knowledge graphs. In such an embodiment, one or more previously generated knowledge graphs are obtained, for example, by retrieving them from one or more databases. It should be noted that having access to more data (e.g., through generating or obtaining more knowledge graphs) allows for improving results of creating enriched data layers and, consequently, universal knowledge graphs. Thus, generating more knowledge graphs, obtaining more knowledge graphs, or both, allows for further improving results of the disclosed embodiments.

At S320, an enriched data layer is generated based on nodes of the knowledge graphs. The enriched data layer may include nodes which indicate respective topics (i.e., topic nodes). Each such topic node is linked to one or more nodes of the original knowledge graphs obtained at S310 such that nodes of those original knowledge graphs are effectively organized by topic.

In an embodiment, generating the enriched data layer includes receiving one or more topic nodes, determining a vector distance between each topic node and each node of the knowledge graphs, and generating a link (e.g., an edge) between the topic node and a node of the knowledge graphs if the vector distance between those nodes is below a predefined threshold. In some implementations, a node of one of the knowledge graphs may be linked to multiple topic nodes (i.e., such that the node may effectively be associated with multiple topics as represented in the universal knowledge graph including the nodes of the original knowledge graphs and the nodes of the enriched data layer).

At S330, a request is received to generate a dashboard. In an embodiment, the request includes one or more topics associated with topic nodes. In some embodiments the request may be initiated via an interaction of a user with a graphical user interface of a user device or automatically by the user device. As a non-limiting example, a user may enter a query via interaction with a current dashboard displayed as a graphical user interface, where the query indicates one or more topics which may be related to the queried content.

In some embodiments, the dashboard may be presented as an analytic application to a user device. An analytic application may be for example, a dashboard structure based on a data model which is shared between several customer accounts. Each customer account has different data while the basic display structure may be the same or similar.

At S340, one or more widgets are selected based on connections between the topic nodes of the enriched data layer and widget nodes of the knowledge graphs. In an embodiment, the selection is based on weights of edges between the topic node and each widget node, a number of links between a topic node and a widget node, a length of time during which a topic node has been linked to a widget node (i.e., an amount of time since the topic node became linked to the widget node), or a combination thereof. In a further embodiment, S340 may further include generating a score representing a relative strength of connection between each topic node and each linked widget node.

In an embodiment, a predetermined number of widgets are determined for selection. As a non-limiting example, a predetermined number of 2 widgets are selected from among the potential widgets. In a further embodiment, the predetermined number may be further based on widget type. As a non-limiting example, the selection may include selecting two widgets of a first type, three widgets of a second type, and the like. The predetermined number of widgets may include widgets show respective widget nodes have the highest scores with the topic nodes of the requested topics.

In an embodiment, a recommended widget list may be generated. The list may include widget recommendations for the dashboard based on a priority. The priority may be determined based, for example, on the match (or strength of link) between the widget node and the topic node. The widget presented to a user (e.g., a widget to be displayed via a dashboard or other graphical user interface) may be presented in order based on the recommended widget list. As a non-limiting example, if a user is presented with a dashboard containing a first widget from the recommended widget list which the user marks as not relevant (e.g., by interacting with the dashboard), the universal knowledge graph system may populate the dashboard with a second widget having the next highest priority on the recommended widget list. The recommended widget list may be organized from highest recommendation to lowest recommendation, and such organization may be based on respective scores (e.g., such that widgets whose respective widget nodes have higher scores are higher on the recommended widget list than widgets whose widget nodes have lower scores).

In an embodiment, widgets are selected based on the availability of data sources. As a non-limiting example, if a widget requires a particular data source or type of data source (i.e., when the widget is stored in that data source or a data source of a particular group of data sources grouped by type) that a user is not authorized or is otherwise unable to access, then the widget is not for the dashboard.

A data source may be, but is not limited to, a database or a portion thereof (e.g., a table). In an embodiment, generating the enriched data layer further includes performing matching to determine if a data source associated with a first knowledge graph matches a data source associated with a second knowledge graph. For example, the column 'name_first' of a first table in a data source associated with a first knowledge graph may be matched to a column 'first_name' of a second table in a data source associated with a second knowledge graph. Matching may be done based on metadata of the data sources, data types, data distribution, word embedding on metadata, based on queries, combinations thereof, and the like.

The matching may further be based on a dictionary of words which are related, share a prefix or suffix, or otherwise share a meaning (e.g., words in different languages, synonyms, combinations thereof, and the like). For example, a first query of the first knowledge graph may reference a column 'salary' while a second query, similar in structure to the first query, in the second knowledge graph may reference a column 'sahar'. Based on the similarity of the queries, and data type, a match may be determined that 'salary' and 'sahar' (which is a transliteration of the Hebrew word for salary as indicated in a dictionary of words in other languages) reference the same type of data.

Figure 4:
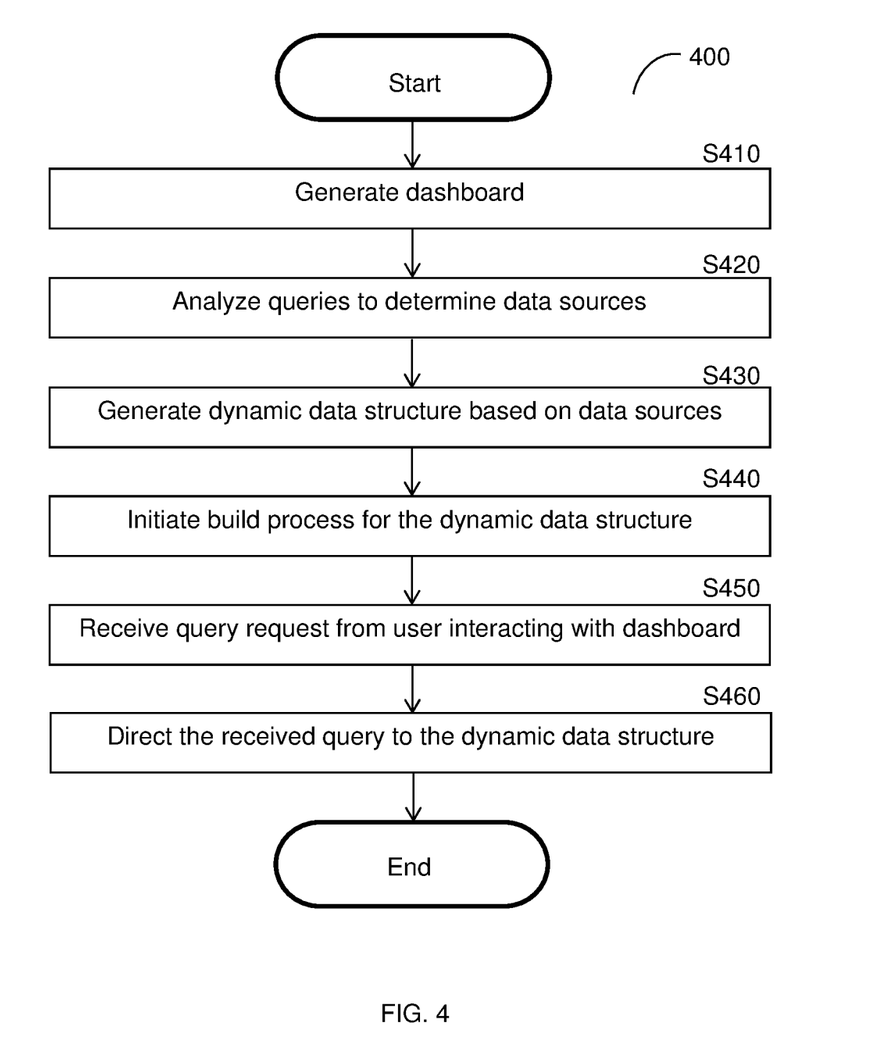
FIG. 4 is a flowchart illustrating a method for generating a dynamic data cube according to an embodiment.

FIG. 4 is a flowchart 400 illustrating a method for generating a dynamic data cube based on a universal knowledge graph according to an embodiment.

At S410, a dashboard is generated based on a user request. Dashboard generation is discussed in more detail with respect to FIG. 3 above. In an embodiment, a graphical user interface (GUI) may include a textual input into which the user can input a topic of interest. A natural language parser may be used to analyze the input to determine a match to one or more topic nodes. The one or more topic nodes may be displayed to the user over the GUI, allowing the user to select any one or more of the topic nodes. Based on the selection of the one or more topic nodes, a dashboard is generated which includes a plurality of widgets, each widget corresponding to one or more queries.

At S420, the one or more queries are analyzed to determine one or more data sources to which the queries are directed. Each of the one or more queries may be directed at one or more data sources. A data source may be a column of a table, a table, a database, and the like.

At S430, a dynamic data structure is generated based on the one or more determined data sources. The dynamic data structure may be, for example, an online analytical processing (OLAP) cube.

The dynamic data structure is the result of extracting, transforming, and loading data from a data source into a data structure which is smaller than the data structure of the data source. Queries which can be executed on the dynamic data structure therefore do not require access to the data sources directly. Accordingly, generating and using the dynamic data structure as described herein results in less latency when querying data.

Dynamic data structures may be initially generated either manually (e.g., by a data scientist), automatically, or through a combination of manual and automatic processes (e.g., a data scientist selecting one or more columns of data from each of multiple databases and a data model being generated automatically using the selected columns). Manually building a dynamic data structure requires laying assumptions about what type of queries users will attempt to execute, and results in a rigid structure which after many hours of labor may not be in line with the actual use required by users. Such a data model may be initialized as the dynamic data structure and then updated as described in accordance with the disclosed embodiments.

At S440, a build process is initiated. The build process includes performing the steps of extracting data from the data sources, transforming the data, and loading the transformed data into the generated dynamic data structure. The data may be transformed such that, for example, the data is in a unified format.

At S450, a query is received. The query may be received in response to a user requesting to load a dashboard, in response to a user requesting to refresh a widget with which the query is associated, a request from a user to apply a filter to a view of a widget, and the like.

At S460, the query is directed to the dynamic data structure. In an embodiment, S460 includes determining whether the query is executable on the dynamic data structure such that the query is only directed to the dynamic data structure when the query is executable on the dynamic data structure. Otherwise, the query is executed on the appropriate data source(s) directly.

Figure 5:
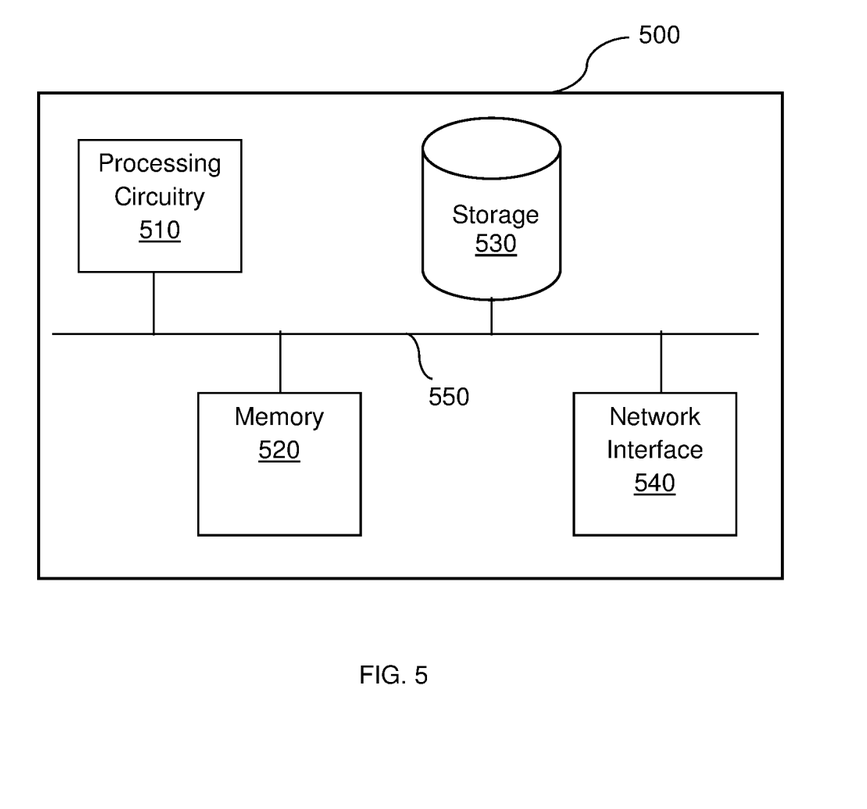
FIG. 5 is a schematic diagram of a universal knowledge graph system according to an embodiment.

FIG. 5 is an example schematic diagram of a universal knowledge graph system 110 according to an embodiment. The universal knowledge graph system 110 includes a processing circuitry 510 coupled to a memory 520, a storage 530, and a network interface 540. In an embodiment, the components of the universal knowledge graph system 110 may be communicatively connected via a bus 550.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the universal knowledge graph system 110 to communicate with, for example, knowledge graph systems (e.g., the knowledge graph systems 122 and 124, FIG. 1).

It should be understood that the embodiments described herein are not limited to the specific architecture illustrated in FIG. 5, and other architectures may be equally used without departing from the scope of the disclosed embodiments.

Figure 6:
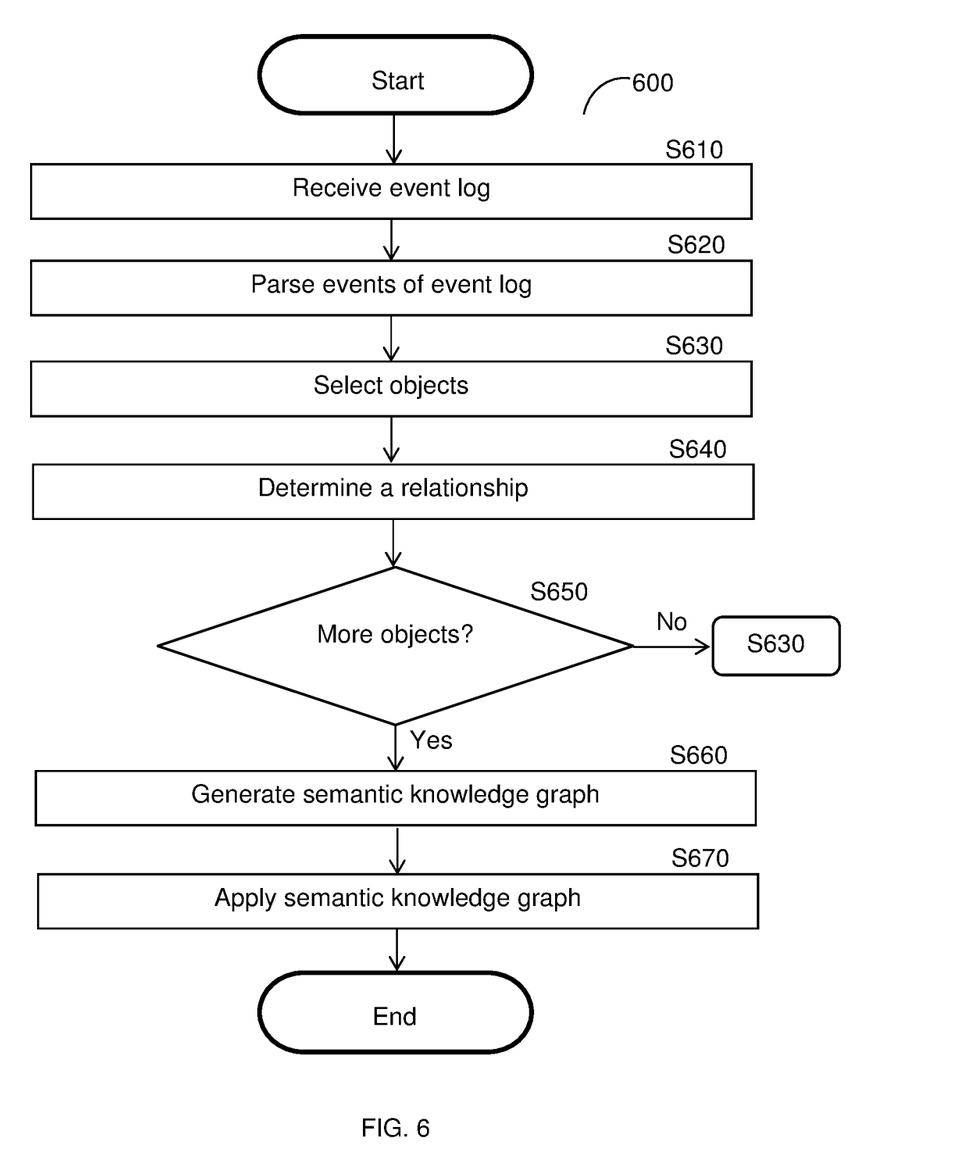
FIG. 6 is a flowchart illustrating a method for generating a semantic knowledge graph from an event log of a business intelligence (BI) system according to an embodiment.

FIG. 6 is a flowchart 600 illustrating a method for generating a semantic knowledge graph from an event log of a business intelligence (BI) system according to an embodiment.

At S610, an event log is received. The event log includes a plurality of events and may be continuously updated. In some embodiments, an initial event log is received, and thereafter events are received either as they occur, periodically, or both. For example, when there is a high volume of events, the events may be received periodically; and when there is a low volume of events, the events may be received as they occur. Events may be instructions related to loading a dashboard, loading a widget, executing one or more queries on one or more data sources, changing a filter on a query, changing a view of a widget, and the like.

At S620, each event of the received event log is parsed to identify objects and relations of those objects to one another. A parsed event may include, but is not limited to, a plurality of query objects and relations thereof. In some embodiments, objects may be further associated with metadata of a columnar relational database. The metadata may be received from a BI system, or by requesting the metadata from the data sources.

At S630, objects are selected from among the identified objects in the parsed event(s). In some embodiments, multiple objects are received and every possible relationship between each pair of two objects from among the objects is determined. Each relationship is further associated with a weight, which is increased based on a number of appearances in a parsed event.

At S640, a relationship is determined between at least a first object and a second object among the identified objects. In some embodiments, the first object, second object, or both, may each have relations to a plurality of other objects.

In certain embodiments, the first object and second object may have a plurality of different relations to each other. For example, an object "SALARY INCOME" may have both a "SUM" and an "AVG" (average) relationship to an object "INVESTMENT_INCOME," depending on the query being executed.

At S650, it is determined if additional objects should be added to the model and, if so, execution continues with S630; otherwise, execution continues with S660. The semantic model may be stored in a memory of a user device, at a network accessible storage device, and the like.

At S660, a semantic knowledge graph is generated (or updated, if one already exists) based on the determined relationships between objects. Generating the semantic knowledge graph may include determining a plurality of query objects and the identified relations between them. In some embodiments, a semantic knowledge graph is generated by identifying a plurality of query objects and generating all possible relations between them. Weights are added to the relations based on the determined relations from the parsed events.

In some embodiments, a semantic knowledge graph may be generated based on a user account. In such embodiments, it may be further useful to determine a link between a user account and each event of the parsed event log, and to only input the parsed events which are linked to the user account into the semantic model.

In some embodiments, a general semantic model is generated for a group of users, which possibly have a dashboard or widget as a common feature. The general semantic model (also referred to as organizational memory model) may include identified objects and relations between the objects, each relationship further carrying a weight. A copy of the organizational memory model may then be associated with a user account and updated by only parsing events which pertain to the user account without changing the original organizational memory model.

The original organizational memory model may be continuously updated by inputting events from all users such that when a new user joins the organization (i.e., a group of users), the new user is presented with a seeded model, which may be customized to the user's needs over time based on use of the model by the user. As a non-limiting example, two users are presented with a copy of a first organizational memory model. Each user, through use, adapts the model (i.e. causes changes to weights of query object relationships) to their usage pattern. The first user adds an object to their copy of the organizational model which the second user does not use, and is therefore not present in the second user's model. However, by continuously updating the first organizational memory model, the added object is present in the model when a third user joins the group, providing the third user with a more enriched model, and therefore more potential to gain insights from data. In some embodiments, individual user models may be updated based on a current version of the general organizational memory model.

In certain embodiments, a node, a relation, or both, may be culled from a semantic knowledge graph. Culling may be done based on, for example but not limited to, frequency of use, values of weights (e.g., relationships having weights below a threshold may be culled), vector distance (e.g., relationships having vector distances exceeding a threshold may be culled), combinations thereof, and the like. The culling may be performed, for example but not limited to, periodically.

In some embodiments, it may be advantageous to maintain snapshots of a semantic model to allow for reverting changes. Snapshots can be stored, for example, periodically. Multiple snapshots may be maintained, for example, for personalized models associated with different user accounts, for the original model, or both. Snapshots may also be stored in response to certain changes of the model. As a non-limiting example, adding or culling a node may trigger storing a snapshot while changing a weight of a relation, adding a relation, or removing a relation, may not.

At optional S670, the semantic knowledge graph is applied. Applying the semantic knowledge graph includes determining one or more outputs based on the organization of the semantic knowledge graph. Such outputs may include, but are not limited to, suggested fields, widgets in reports, user profiles or portions thereof, cache contents to be used for cache warmups, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating data visualizations, by a computer system, comprising:
receiving events by the computer system;
parsing, by the computer system, each of a plurality of the received events into a plurality of objects, wherein the plurality of events includes a plurality of queries, wherein each event of the plurality of events is related to an interaction with at least one data source;
determining, by the computer system, for each of the plurality of events, a relationship between two objects of the plurality of objects;
generating, by the computer system, a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge;
repeating, by the computer system, the receiving, parsing, determining, and generating so as to cause the first semantic knowledge graph to be updated continually over time as events occur;
assigning, by the computer system, a score to each edge, wherein the score assigned to each edge indicates a weight of the edge, wherein the score assigned to each edge is determined based on a number of appearances of the relationship represented by the edge in the parsed plurality of events;
generating, by the computer system, an enriched data layer based on a plurality of knowledge graphs including the first semantic knowledge graph, the plurality of knowledge graphs including a plurality of first nodes, the enriched data layer including a plurality of second nodes, wherein each of the plurality of second nodes is connected via an edge to at least one of the plurality of first nodes; and
generating, by the computer system, a data visualization based on the enriched data layer and a request for data, wherein the request for data indicates a type of data corresponding to at least one of the plurality of second nodes, wherein the data visualization is generated using data represented by at least one of the plurality of first nodes connected to the at least one of the plurality of second nodes.

2. The method of claim 1, wherein generating the enriched data layer further comprises:
generating a universal knowledge graph including the plurality of first nodes and the plurality of second nodes.

3. The method of claim 2, further comprising:
determining a match between a first data source and a second data source of a plurality of data sources, wherein the first data source is associated with a first knowledge graph of the plurality of knowledge graphs, wherein the second data source is associated with a second knowledge graph of the plurality of knowledge graphs, wherein one of the first nodes from the first knowledge graph and one of the first nodes from the second knowledge graph are connected via an edge to one of the plurality of second nodes in the universal knowledge graph.

4. The method of claim 1, wherein the generated data visualization is provided via a graphical user interface.

5. The method of claim 4, wherein each edge has a weight, further comprising:
when a user interaction with the graphical user interface fails to meet at least one threshold requirement, reducing the weight of the edge.

6. The method of claim 1, wherein the plurality of second nodes includes a plurality of topic nodes, wherein each topic node represents a topic, wherein each of the plurality of first nodes connected via an edge to one of the topic nodes represents data that is related to the topic.

7. The method of claim 6, further comprising:
determining a vector distance between a topic node of the plurality of topic nodes and a first node of the plurality of first nodes;
determining whether the vector distance is below a distance threshold, wherein the data visualization is generated when the vector distance is below the distance threshold.

8. The method of claim 6, wherein the plurality of first nodes includes a plurality of widget nodes, wherein each widget node represents a respective widget of a plurality of widgets, wherein each widget is an interface corresponding to at least one query executed on at least one data source, further comprising:
selecting at least one widget from among the plurality of widgets based on the request for data and the plurality of widget nodes, wherein the data visualization includes at least a portion of the selected at least one widget.

9. The method of claim 1, wherein the data visualization is a first data visualization, and wherein a second knowledge graph of the plurality of knowledge graphs includes at least one third node, further comprising:
determining a plurality of vector distances including a vector distance between the first node and the second node and a vector distance between the first node and each of the at least one third node; and
generating at least one second data visualization, wherein each of the at least one second data visualization is generated for a respective one of the at least one third node, wherein the first data visualization and the at least one second data visualization are generated in order based on the plurality of vector distances.

10. The method of claim 1, wherein each of the plurality of knowledge graphs has a respective distinct structure.

11. A non-transitory computer readable medium having stored thereon instructions for causing a processing circuitry of a computer system to execute a process, the process comprising:
receiving events by the computer system;
parsing, by the computer system, each of a plurality of the received events into a plurality of objects, wherein the plurality of events includes a plurality of queries, wherein each event of the plurality of events is related to an interaction with at least one data source;
determining, by the computer system, for each of the plurality of events, a relationship between two objects of the plurality of objects;
generating, by the computer system, a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge;

repeating, by the computer system, the receiving, parsing, determining, and generating so as to cause the first semantic knowledge graph to be updated continually over time as events occur;

assigning, by the computer system, a score to each edge, wherein the score assigned to each edge indicates a weight of the edge, wherein the score assigned to each edge is determined based on a number of appearances of the relationship represented by the edge in the parsed plurality of events;

generating, by the computer system, an enriched data layer based on a plurality of knowledge graphs including the first semantic knowledge graph, the plurality of knowledge graphs including a plurality of first nodes, the enriched data layer including a plurality of second nodes, wherein each of the plurality of second nodes is connected via an edge to at least one of the plurality of first nodes; and generating, by the computer system a data visualization based on the enriched data layer and a request for data, wherein the request for data indicates a type of data corresponding to at least one of the plurality of second nodes, wherein the data visualization is generated using data represented by at least one of the plurality of first nodes connected to the at least one of the plurality of second nodes.

12. A system for generating data visualizations, comprising:
a processing circuitry; and
a memory, the memory containing instructions that, when executed by the processing circuitry, configure the system to:
parse each of a plurality of received events into a plurality of objects, wherein the plurality of events includes a plurality of queries, wherein each event of the plurality of events is related to an interaction with at least one data source;
determine for each of the plurality of events, a relationship between two objects of the plurality of objects;
generate a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge;
repeat the receiving, parsing, determining, and generating so as to cause the first semantic knowledge graph to be updated continually over time as events occur;
assign a score to each edge, wherein the score assigned to each edge indicates a weight of the edge, wherein the score assigned to each edge is determined based on a number of appearances of the relationship represented by the edge in the parsed plurality of events;
generate an enriched data layer based on a plurality of knowledge graphs including the first semantic knowledge graph, the plurality of knowledge graphs including a plurality of first nodes, the enriched data layer including a plurality of second nodes, wherein each of the plurality of second nodes is connected via an edge to at least one of the plurality of first nodes; and
generate a data visualization based on the enriched data layer and a request for data, wherein the request for data indicates a type of data corresponding to at least one of the plurality of second nodes, wherein the data visualization is generated using data represented by at least one of the plurality of first nodes connected to the at least one of the plurality of second nodes.

13. The system of claim 12, wherein the system is further configured to:
generate a universal knowledge graph including the plurality of first nodes and the plurality of second nodes.

14. The system of claim 13, wherein the system is further configured to:
determine a match between a first data source and a second data source of a plurality of data sources, wherein the first data source is associated with a first knowledge graph of the plurality of knowledge graphs, wherein the second data source is associated with a second knowledge graph of the plurality of knowledge graphs, wherein one of the first nodes from the first knowledge graph and one of the first nodes from the second knowledge graph are connected via an edge to one of the plurality of second nodes in the universal knowledge graph.

15. The system of claim 12, wherein the generated data visualization is provided via a graphical user interface.

16. The system of claim 15, wherein each edge has a weight, wherein the system is further configured to:
when a user interaction with the graphical user interface fails to meet at least one threshold requirement, reduce the weight of the edge.

17. The system of claim 12, wherein the plurality of second nodes includes a plurality of topic nodes, wherein each topic node represents a topic, wherein each of the plurality of first nodes connected via an edge to one of the topic nodes represents data that is related to the topic.

18. The system of claim 17, wherein the system is further configured to:
determine a vector distance between a topic node of the plurality of topic nodes and a first node of the plurality of first nodes;
determine whether the vector distance is below a distance threshold, wherein the data visualization is generated when the vector distance is below the distance threshold.

19. The system of claim 17, wherein the plurality of first nodes includes a plurality of widget nodes, wherein each widget node represents a respective widget of a plurality of widgets, wherein each widget is an interface corresponding to at least one query executed on at least one data source, wherein the system is further configured to:
select at least one widget from among the plurality of widgets based on the request for data and the plurality of widget nodes, wherein the data visualization includes at least a portion of the selected at least one widget.

20. The system of claim 12, wherein the data visualization is a first data visualization, and wherein a second knowledge graph of the plurality of knowledge graphs includes at least one third node, wherein the system is further configured to:
determine a plurality of vector distances including a vector distance between the first node and the second node and a vector distance between the first node and each of the at least one third node; and generate at least one second data visualization, wherein each of the at least one second data visualization is generated for a respective one of the at least one third node, wherein the first data visualization and the at least one second data visualization are generated in order based on the plurality of vector distances.

\* \* \* \* \*